US012605675B2

(12) United States Patent
Yamashita et al.

(10) Patent No.: US 12,605,675 B2
(45) Date of Patent: Apr. 21, 2026

(54) HOLLOW FIBER MEMBRANE MODULE

(71) Applicant: NOK CORPORATION, Tokyo (JP)

(72) Inventors: Matsuyoshi Yamashita, Shizuoka (JP);
Yosuke Ito, Shizuoka (JP); **Tsuyoshi
Emoto**, Shizuoka (JP)

(73) Assignee: NOK CORPORATION, Tokyo (JP)

( * ) Notice: Subject to any disclaimer, the term of this
patent is extended or adjusted under 35
U.S.C. 154(b) by 383 days.

(21) Appl. No.: 18/288,440

(22) PCT Filed: Apr. 15, 2022

(86) PCT No.: PCT/JP2022/017935
§ 371 (c)(1),
(2) Date: Oct. 26, 2023

(87) PCT Pub. No.: WO2023/276414
PCT Pub. Date: Jan. 5, 2023

(65) Prior Publication Data
US 2024/0198289 A1 Jun. 20, 2024

(30) Foreign Application Priority Data

Jun. 30, 2021 (JP) ................................. 2021-108770

(51) Int. Cl.
*B01D 63/04* (2006.01)
*B01D 63/02* (2006.01)
(52) U.S. Cl.
CPC ......... *B01D 63/04* (2013.01); *B01D 63/0233*
(2022.08)
(58) Field of Classification Search
CPC .. B01D 63/04; B01D 63/0233; B01D 63/024;
B01D 2315/22; B01D 2323/02; B01D
2323/04; B01D 63/02; C08L 81/02; C08L
83/04; C08L 63/00; H01M 8/04149;
Y02E 60/50

USPC ......................................................... 210/232
See application file for complete search history.

(56) References Cited

U.S. PATENT DOCUMENTS

2011/0000842 A1 1/2011 Takagi
2012/0304856 A1 12/2012 Kanetsuki et al.
2015/0007729 A1 1/2015 Kanetsuki et al.
(Continued)

FOREIGN PATENT DOCUMENTS

JP 61-157309 7/1986
JP 4-78929 7/1992
JP 6-277460 10/1994
(Continued)

OTHER PUBLICATIONS

International Search Report issued in International Patent Application No. PCT/JP2022/017935, dated Jun. 7, 2022.

*Primary Examiner* — Ekandra S. Miller-Cruz
(74) *Attorney, Agent, or Firm* — Greenblum & Bernstein, P.L.C.

(57) ABSTRACT

A hollow fiber membrane module having: a tubular case; a plurality of hollow fiber membranes disposed within the case; sealing and fixing parts that fix the hollow fiber membranes to each other at the ends of the plurality of hollow fiber membranes; and sealing parts that seal annular gaps between the case and the sealing and fixing parts. The sealing parts are bonded to the inner peripheral surface of the case and the outer peripheral surface of the sealing and fixing parts while being allowed to expand or contract in the direction in which the spacing of the gaps between the case and the sealing and fixing parts changes.

7 Claims, 6 Drawing Sheets

(56)　　　　　　References Cited

U.S. PATENT DOCUMENTS

| | | | |
|---|---|---|---|
| 2018/0221812 | A1 | 8/2018 | Kanetsuki et al. |
| 2019/0201839 | A1 | 7/2019 | Kanetsuki et al. |

FOREIGN PATENT DOCUMENTS

| | | |
|---|---|---|
| JP | 8-84914 | 4/1996 |
| JP | 2007-61666 | 3/2007 |
| JP | 2009-208013 | 9/2009 |
| JP | 2015-24408 | 2/2015 |
| JP | 2015-181985 | 10/2015 |
| JP | 2015-181986 | 10/2015 |
| JP | 2017-70934 | 4/2017 |

HOLLOW FIBER MEMBRANE MODULE

TECHNICAL FIELD

The present invention relates to a hollow fiber membrane module having a plurality of hollow fiber membranes.

BACKGROUND ART

Hollow fiber membrane modules are used for purposes such as humidification and filtration. In a hollow fiber membrane module, a plurality of hollow fiber membranes are disposed in the form of bundles within a case. At an end of the bundled hollow fiber membranes there is provided, by means of a potting material, a sealing and fixing part that seals gaps between the hollow fiber membranes and that fixes the hollow fiber membranes to each other, while leaving the hollow interior of the hollow fiber membranes open. This sealing and fixing part may be fixed to the case through direct bonding thereto. In usage environments where leakage occurs on account of gaps that arise between the sealing and fixing part and the case, a sealing part may be additionally provided in an annular gap between the sealing and fixing part and the case. The sealing part can be provided through fixing by bonding of a rubber-made sealing member, or through curing of an injected liquid seal. In this way, the annular gap between the sealing and fixing part and the case can be sealed by the sealing part.

However, when used in an environment where temperature changes significantly, differences in the extent of thermal expansion between the sealing and fixing part and the case become large, and sufficient sealing may fail to be achieved with a sealing part having a conventional structure. Hollow fiber membrane modules are suitably used for the purpose of moistening an electrolyte membrane in fuel cells, and the temperature ranges of the environments where fuel cells are used is increasing.

CITATION LIST

Patent Literature

[PTL 1]
Japanese Patent Application Publication No. 2009-208013
[PTL 2]
Japanese Patent Application Publication No. 2017-70934

SUMMARY OF INVENTION

Technical Problem

It is an object of the present invention to provide a hollow fiber membrane module having stable sealability even under usage environments in which the temperature range is wide.

Solution to Problem

The present invention relies on the following means to achieve the above object.

Specifically, the hollow fiber membrane module of the present invention includes:

a tubular case of which at least one end is open;

a plurality of hollow fiber membranes disposed within the case;

a sealing and fixing part that seals a gap between the hollow fiber membranes and fixes the hollow fiber membranes to each other at an opening side of the case and an end of the plurality of hollow fiber membranes, while leaving a hollow interior of the hollow fiber membranes open; and a sealing part that seals an annular gap between the case and the sealing and fixing part, wherein the sealing part is bonded to an inner peripheral surface of the case and to an outer peripheral surface of the sealing and fixing part, while being allowed to expand or contract in a direction in which a spacing of the gap between the case and the sealing and fixing part changes.

In the present invention, even when the spacing of the gap between the case and the sealing and fixing part changes because of the difference in the extent of thermal expansion between the case and the sealing and fixing part, a state is maintained in which the annular gap between the case and the sealing and fixing part is sealed by expanding and contracting of the sealing part.

At least part of a portion, which is in contact with the case, of the sealing part may not be bound to the case so that the sealing part is allowed to expand or contract in the direction in which the spacing of the gap between the case and the sealing and fixing part changes.

At least part of a portion, which is in contact with the case, of the sealing part may not be bonded to the case so that the sealing part is allowed to expand or contract in the direction in which the spacing of the gap between the case and the sealing and fixing part changes.

An annular cutout, in which the sealing part is mount, may be provided on an end face side of the case, the cutout having a planar portion adjacent to the inner peripheral surface, which is in contact with the sealing and fixing part, of the case and an inner peripheral surface portion opposing an outer peripheral surface of the sealing and fixing part, and at least part of a portion, which is in contact with the planar portion, of the sealing part may not be bonded to the case so that the sealing part is allowed to expand or contract in the direction in which the spacing of the gap between the case and the sealing and fixing part changes.

The case may be made of polyphenylene sulfide, the sealing and fixing part may be made of an epoxy resin, and the sealing part may be made of a cured liquid silicone material; and $0.01 \times L1 \leq L2 \leq 0.1 \times L1$ may be set to be satisfied, where, in a cross section of the sealing and fixing part and the sealing part along a plane that includes a center of the opening, $L1$ is a width of the sealing and fixing part in a direction perpendicular to a direction in which the hollow fiber membranes extend and $L2$ is a length of the portion, which is not in contact with the planar portion, of the sealing part, in the perpendicular direction.

The case may be made of polyphenylene sulfide, the sealing and fixing part may be made of an epoxy resin, and the sealing part may be made of a cured liquid silicone material; and $0.02 \times L1 \leq L2 \leq 0.05 \times L1$ may be set to be satisfied, where, in a cross section of the sealing and fixing part and the sealing part along a plane that includes a center of the opening, $L1$ is a width of the sealing and fixing part in a direction perpendicular to a direction in which the hollow fiber membranes extend and $L2$ is a length of the portion, which is not in contact with the planar portion, of the sealing part, in the perpendicular direction.

An annular depressed portion may be provided in a portion, which is in contact with the sealing and fixing part, of the inner peripheral surface of the case.

This suppresses positional deviations of the sealing and fixing part relative to the case.

A stepped portion may be provided in a portion, which is in contact with the sealing and fixing part, of the inner peripheral surface of the case.

This suppresses positional deviations of the sealing and fixing part relative to the case.

The above configurations may be combined with each other wherever possible.

Advantageous Effects of Invention

As explained above, the present invention allows the hollow fiber membrane module to have stable sealability even under usage environment in which the temperature range is wide.

DESCRIPTION OF EMBODIMENTS

Modes for carrying out the present invention will be explained in detail below on the basis of embodiments, with reference to accompanying drawings. Unless otherwise stated, however, the dimensions, materials, shapes, relative arrangements and so forth of the constituent elements described in the embodiments are not meant to limit the scope of the present invention to the foregoing alone.

Embodiment 1

Figure 1:
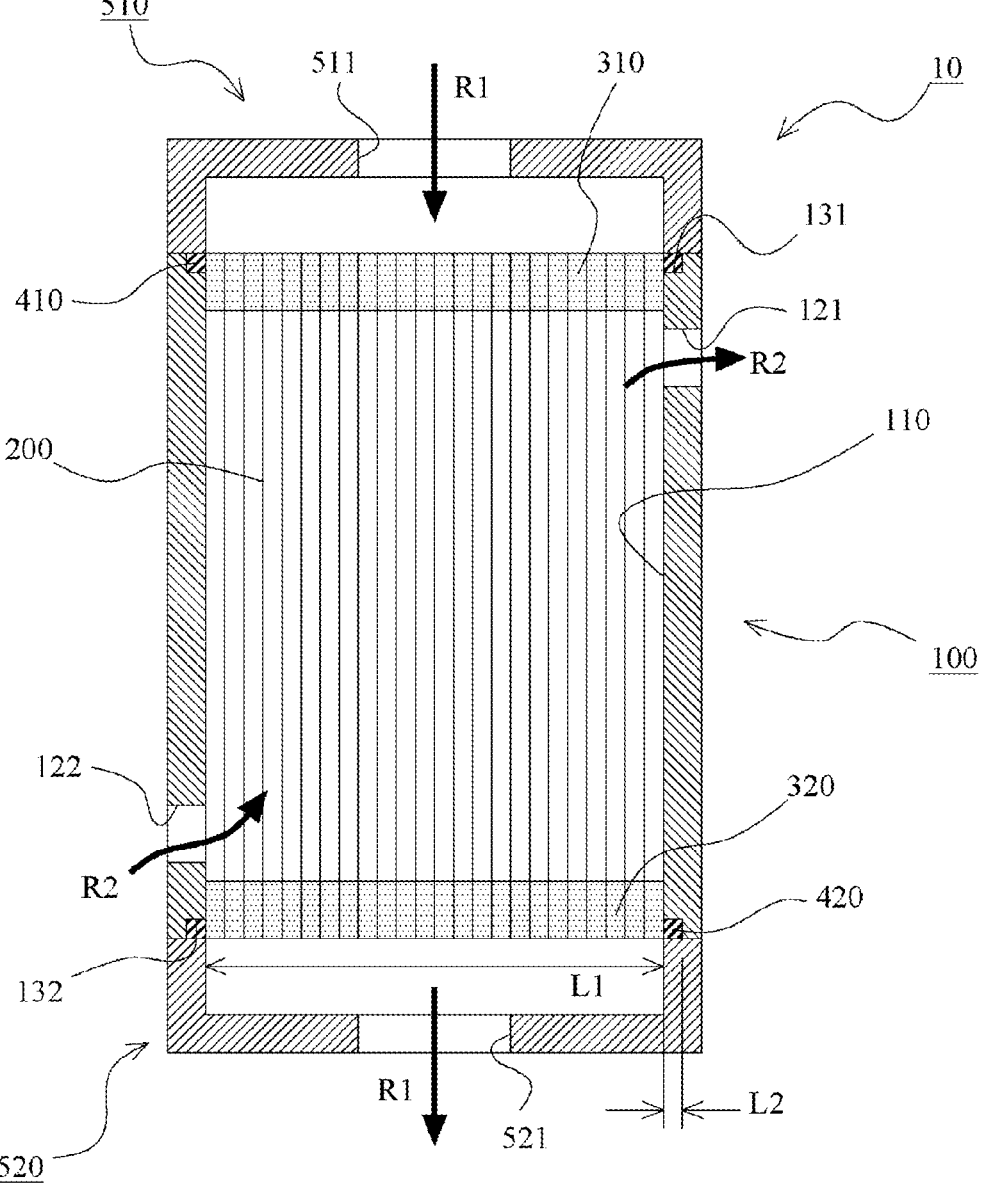
FIG. 1 is a schematic cross-sectional diagram of a hollow fiber membrane module according to Embodiment 1 of the present invention.
Figure 2:
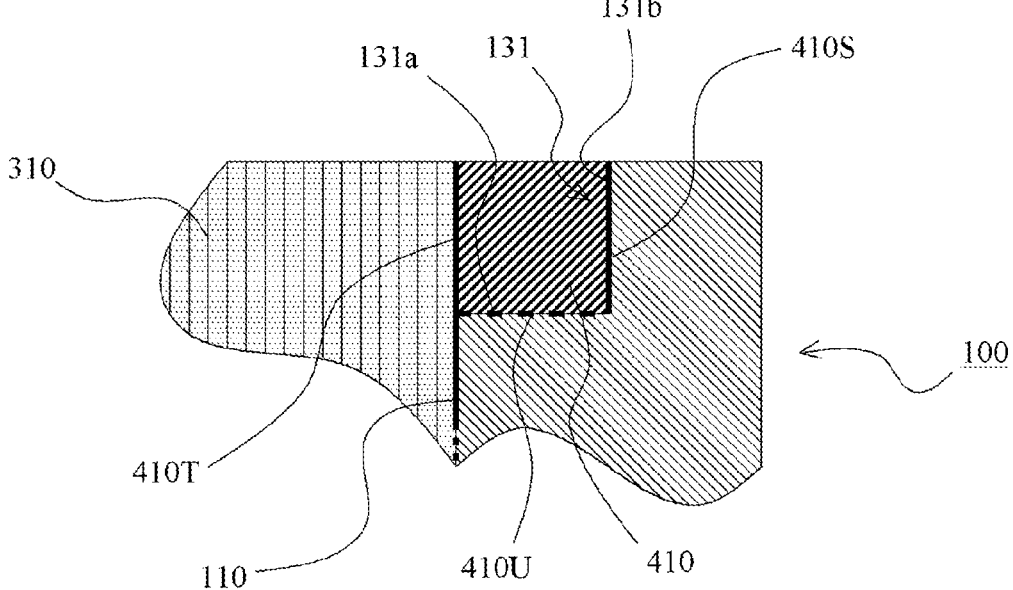
FIG. 2 is a partial enlarged-view diagram of FIG. 1.

A hollow fiber membrane module according to Embodiment 1 of the present invention will be explained with reference to FIG. 1 and FIG. 2. FIG. 1 is a schematic cross-sectional diagram of a hollow fiber membrane module according to Embodiment 1 of the present invention along a plane that includes the center of an opening of a case. FIG. 2, which is a partial enlarged-view diagram of FIG. 1 showing the vicinity of a sealing part.

<Overall Structure of the Hollow Fiber Membrane Module>

A hollow fiber membrane module 10 according to the present embodiment includes a tubular case 100 of which both ends are open, a plurality of hollow fiber membranes 200 disposed within the case 100, and sealing and fixing parts 310, 320 provided at the ends of the plurality of hollow fiber membranes 200. In the present embodiment, the sealing and fixing parts 310, 320 are provided at respective ends of the bundled hollow fiber membranes 200. The sealing and fixing parts 310, 320 seal gaps between the hollow fiber membranes 200, and fix the hollow fiber membranes to each other, in a state where the hollow interior of the hollow fiber membranes is open. The hollow fiber membrane module 10 according to the present embodiment is provided with sealing parts 410, 420 which seal respective annular gaps between the case 100 and the sealing and fixing parts 310, 320. Lid members 510, 520 are provided at respective ends of the case 100.

The case 100 is made of a metal such as aluminum, or a resin material such as polyphenylene sulfide (PPS). The case 100 is provided with through-holes 121, 122 that can be used as an inlet or an outlet for fluid. Although FIG. 1 illustrates an example in which two through-holes are provided, the number of through-holes may be set as appropriate. Annular cutouts 131, 132 are provided at end face sides of the case 100. In the present embodiment, the cutouts 131, 132 are provided at respective ends of the case. The cutouts 131, 132 have a planar portion adjacent to an inner peripheral surface 110, which is in contact with the sealing and fixing parts 310, 320, of the case 100, and an inner peripheral surface portion that opposes the outer peripheral surface of the sealing and fixing parts 310, 320 (see planar portion 131a and inner peripheral surface portion 131b in FIG. 2). Various shapes such as a cylindrical shape or a box-like shape may be adopted as the shape of the case 100.

In a case where the hollow fiber membrane module 10 is used in a humidifier or a dehumidifier, in an embodiment, PPSU (polyphenylsulfone) with moisture permeability by capillary condensation mechanism with controlled pore size can be used as the material of the hollow fiber membranes 200. A hydrophilic hollow fiber membrane can be obtained by spinning using a membrane-forming solution (starting material of the hollow fiber membrane) prepared by adding PPSU and a hydrophilic polymer (Polyvinylpyrrolidone) to a solvent. A hydrophilic material Nafion (registered trademark) with moisture permeability by dissolution and diffusion may also be used. Materials such as the above boast low elution properties and high strength, and accordingly can be suitably used in humidifiers and dehumidifiers. In the present embodiment, all the hollow fiber membranes 200 are accommodated in the case 100 while extending linearly forming a bundle.

The sealing and fixing parts 310, 320 are made of a potting material such as an epoxy resin or urethane resin. The sealing and fixing parts 310, 320 can be obtained by filling the ends of the bundle of the hollow fiber membranes 200 with a liquid potting material, curing it, and cutting the cured potting material together with part of the bundle of the hollow fiber membranes 200. This allows the sealing and fixing parts 310, 320 to seal gaps between the hollow fiber membranes 200 and fix the hollow fiber membranes 200 to each other, in a state where the hollow interior of the hollow fiber membranes 200 is left open. In the present embodiment, after filling the liquid potting material in a state where the bundle of hollow fiber membranes 200 are disposed in the case 100 and forming the cured sealing and fixing parts 310, 320, the case 100 and the sealing and fixing parts 310, 320 are separated from each other. In FIG. 2, the portion where the inner peripheral surface 110 of the case 100 and the sealing and fixing part 310 come into contact with each other (portion denoted by the two-dot chain line in the figure) is a separation portion. The underlying reason for this separation will be explained briefly next. If the case 100 and the sealing and fixing parts 310, 320 are used in a state where they are bonded to each other, partial separation may occur due to differences in linear expansion between respective members, depending on the materials and dimensions of the members and on usage conditions. Stress derived from linear expansion concentrates as a result in non-separated portions, which entails the concern of impaired sealability.

Therefore, the above problem can be forestalled by eliciting separation beforehand over the entire surface.

The sealing parts 410, 420 are composed of sealing members that are made of an elastomer material such as rubber or composed of members obtained through curing of a liquid seal (for instance liquid silicone). The sealing parts 410, 420 are respectively provided in the cutouts 131, 132 of the case 100.

The lid members 510, 520 are provided with through-holes 511, 521 that are used as an inlet or an outlet for fluid, respectively. In the present embodiment, the gaps between the lid members 510, 520 and the case 100 are sealed by the sealing parts 410, 420. Note that the gap between the lid members 510, 520 and the case 100 can be sealed by another sealing member or can be sealed by both the sealing parts 410, 420 and another sealing member.

An instance where the hollow fiber membrane module 10 configured as described above is used as a humidifier will be explained next. As illustrated in FIG. 1, a gas to be humidified (for example dry air) is supplied into the case 100 via the through-hole 511 of the lid member 510. Then the gas to be humidified passes through the hollow interior of the hollow fiber membranes 200 and is discharged out of the through-hole 521 of the lid member 520 (see arrows R1). A moist gas is supplied into the case 100 via the through-hole 122. Then the moist gas passes over the exterior of the hollow fiber membranes 200 and flows out of the through-hole 121 to the exterior of the case 100 (see arrows R2). Thus, moisture in the moist gas migrates, by virtue of the membrane separation action of the hollow fiber membranes 200, towards the gas to be humidified, to elicit humidification of the gas.

<Sealing Part>

The sealing parts 410, 420 will be explained in detail next. The sealing parts 410, 420 according to the present embodiment are bonded to the inner peripheral surface 110 of the case 100 and the outer peripheral surface of the sealing and fixing parts 310, 320 while being allowed to expand or contract in the direction in which the gaps between the case 100 and the sealing and fixing parts 310, 320 change, respectively. More specifically, the sealing parts 410, 420 are configured so that at least part of a portion thereof in contact with the case 100 is not bound to the case 100, as a result of which the sealing parts 410, 420 are allowed to expand or contract in the direction in which the gaps between the case 100 and the sealing and fixing parts 310, 320 change. More specifically, the sealing parts 410, 420 are configured so that at least part of the portions thereof in contact with the case 100 are not bonded to the case 100, as a result of which the sealing parts 410, 420 are allowed to expand or contract in the direction in which the gaps between the case 100 and the sealing and fixing parts 310, 320 change. This point will be explained below with reference to FIG. 2, which illustrates an enlarged-view diagram of the vicinity of the sealing part 410. The configuration and operation of the sealing part 420 are identical to those of the sealing part 410, and hence an explanation thereof will be omitted.

An outer peripheral surface 410S of the sealing part 410 is entirely bonded to the inner peripheral surface 110 of the case 100 (inner peripheral surface portion 131b of the cutout 131), and an inner peripheral surface 410T of the sealing part 410 is entirely bonded to the outer peripheral surface of the sealing and fixing part 310. However, the sealing part 410 is not bonded to at least part of the planar portion 131a of the cutout 131. In the present embodiment, the planar portion 131a and a surface 410U of the sealing part 410 opposing the planar portion 131a are not bonded over the surface at all. This allows the sealing part 410 to expand or contract in the direction in which the spacing of the gap between the case 100 and the sealing and fixing part 310 changes.

In a case where the sealing part 410 is composed of a sealing member made of an elastomer material such as rubber, only the outer peripheral surface 410S and the inner peripheral surface 410T may be bonded by applying an adhesive on the outer peripheral surface 410S and the inner peripheral surface 410T of the sealing part 410 (or on the inner peripheral surface 110 of the case 100 and the outer peripheral surface of the sealing and fixing part 310). In a case where the sealing part 410 is composed of a member obtained by curing a liquid seal, a material to which the liquid seal does not bond may be coated, or masking may be performed onto the planar portion 131a of the cutout 131 prior to filling the liquid seal. A fluorine-based material such as Teflon (registered trademark) may be used in the coating. In this case, the sealing part 410 can be formed by coating the planar portion 131a, then forming the sealing and fixing part 310, then filling of the cutout 131 with the liquid seal.

<Advantages of the Hollow Fiber Membrane Module According to the Present Embodiment>

In the hollow fiber membrane module 10 according to the present embodiment, the sealing parts 410, 420 expand or contract upon changes in the spacing of the gaps between the case 100 and the sealing and fixing parts 310, 320 because of differences in the extent of thermal expansion between the case 100 and the sealing and fixing parts 310, 320. This allows a state in which the annular gaps between the case 100 and the sealing and fixing parts 310, 320 are sealed to be maintained. Stable sealability can be therefore achieved, also under conditions of a wide temperature range in the usage environment. Even if the case 100 and the sealing and fixing parts 310, 320 behave such that these exhibit relative positional deviations in the direction in which the hollow fiber membranes 200 extend, expansion or contraction of the sealing parts 410, 420 allows herein suppressing the load of stress acting upon the bonded portion between the sealing parts 410, 420 and the sealing and fixing parts 310, 320, upon the bonded portion between the sealing parts 410, 420 and the inner peripheral surface 110 of the case 100, and upon the sealing parts 410, 420 themselves.

The range of the portions of the sealing parts 410, 420 that are not bound (not bonded) to the case 100 may be set as appropriate in accordance with the temperature range in the usage environment, and in accordance with the dimensions and coefficients of thermal expansion of the various members. An example of this will be explained below. The following explanation about the sealing part 410 may apply likewise to the sealing part 420.

An instance will be explained where the case 100 is made of polyphenylene sulfide (PPS), the sealing and fixing part 310 is made of an epoxy resin, and the sealing part 410 is made of a material of cured liquid silicone.

As viewed in a cross section of the sealing and fixing part 310 and the sealing part 410 along a plane that includes the center of an opening of the case 100, L1 is defined as the width of the sealing and fixing part 310 in a direction perpendicular to the direction in which the hollow fiber membranes 200 extend, and L2 is defined as the length of the portion, which is not in contact with the planar portion 131a, of the sealing part 410 in the perpendicular direction (see FIG. 1).

$0.01 \times L1 \leq L2 \leq 0.1 \times L1$ may be satisfied, and preferably $0.02 \times L1 \leq L2 \leq 0.05 \times L1$ may be satisfied. The lower limit of the range may be set from the viewpoint of not adversely affecting the bonded portion between the sealing part 410 and the sealing and fixing part 310, the bonded portion between the sealing part 410 and the case 100, or expansion or contraction of the sealing part 410, when the sealing part 410 expands or contracts on account of differences in the extent of thermal expansion between the sealing and fixing part 310 and the case 100. The upper limit of the range may be set from the viewpoint of precluding the case 100 from becoming unnecessarily large.

For instance, L1=160 mm applies in a case where the case 100 is cylindrical and has an inner diameter of 160 mm. In this case, L2 may be set to be from 1.6 mm to 16 mm, and preferably from 3.2 mm to 8 mm. Further, L1=200 mm applies in a case where the case 100 has a box shape and an opening thereof is 200 mm×160 mm, as viewed in a cross section parallel to the long sides. In this case, L2 may be set to be from 2 mm to 20 mm, and preferably from 4 mm to 10 mm. Further, L1=160 mm applies, as viewed in a cross section parallel to the short sides. In this case, L2 may be set to be from 1.6 mm to 16 mm, and preferably from 3.2 mm to 8 mm.

By adopting the above settings, the hollow fiber membrane module 10 can be applied to vehicle fuel cells, such that stable sealability can be maintained even in environments where the hollow fiber membrane module 10 is used in a cold climate at −30° C. or below. The hollow fiber membrane module 10 is exposed to an environment of 100° C. or above during operation of the fuel cell. Therefore, the hollow fiber membrane module 10 according to the present embodiment can be suitably used also in a case where the usage environment temperature ranges from about −40° C. to 120° C.

Embodiment 2

Figure 3:
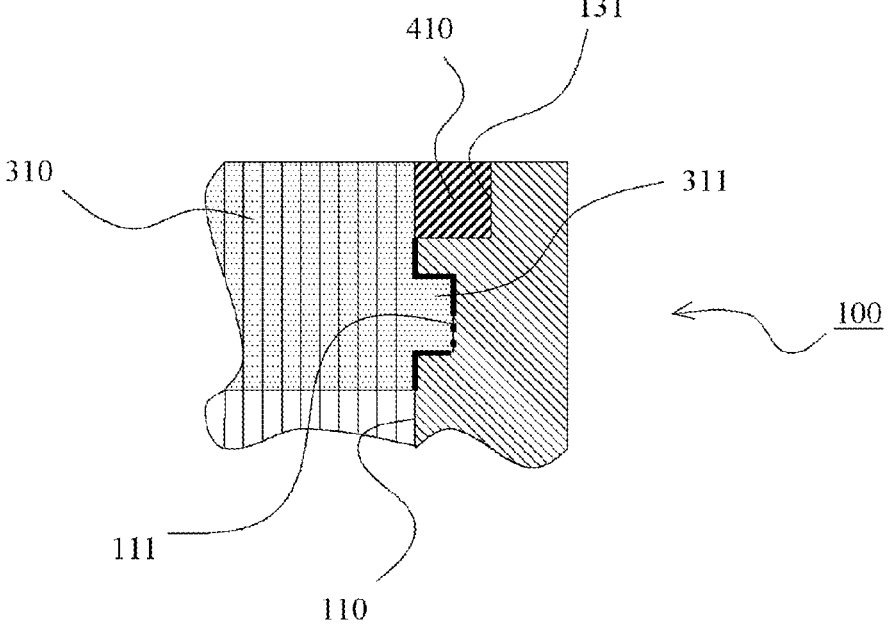
FIG. 3 is a partial enlarged-view diagram of a schematic cross-sectional diagram of a hollow fiber membrane module according to Embodiment 2 of the present invention.

FIG. 3 illustrates Embodiment 2 of the present invention. The present embodiment shows a configuration where the structure of the case is different from that of Embodiment 1. Other features and effects are identical to those of in Embodiment 1, and hence identical constituent portions will be denoted by the same reference numerals, and an explanation thereof will be omitted.

FIG. 3 is a partial enlarged-view diagram of a schematic cross-sectional diagram of a hollow fiber membrane module according to Embodiment 2 of the present invention, in which the vicinity of a sealing part is enlarged. In the present embodiment, an annular depressed portion 111 is provided in a portion, which is in contact with the sealing and fixing part 310, of the inner peripheral surface 110 of the case 100. The sealing and fixing part 310 is provided with an annular protruded portion 311 configured to fit into the annular depressed portion 111. This prevents the sealing and fixing part 310 from becoming positionally offset relative to the case 100. This can ease shear stress acting on the sealing part 410. The configurations of the sealing part 410 and so forth are identical to those of Embodiment 1, and hence effects identical to those of Embodiment 1 can be achieved herein. Similarly to Embodiment 1, in the present embodiment, the case 100 and the sealing and fixing parts 310, 320 are separated from each other. In FIG. 3, the portion where the inner peripheral surface 110 of the case 100 and the sealing and fixing part 310 are in contact with each other (portion of the two-dot chain line in the figure) is a separation portion.

Embodiment 3

Figure 4:
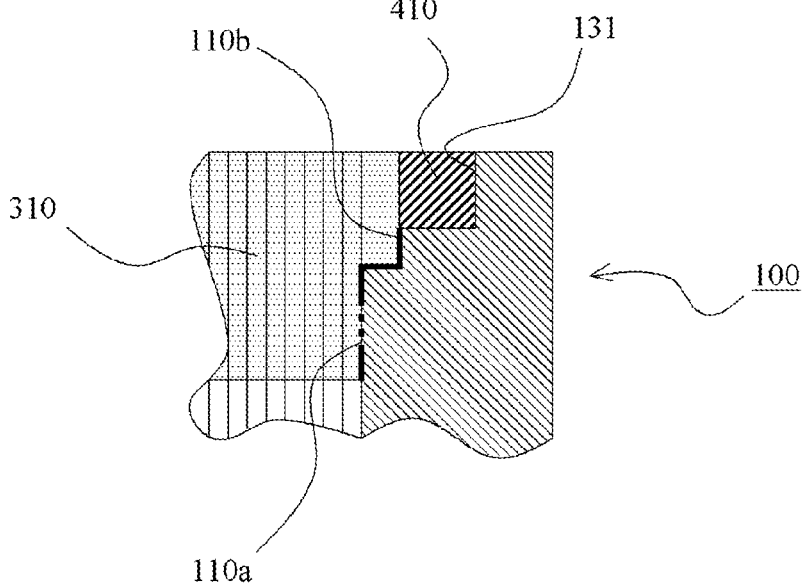
FIG. 4 is a partial enlarged-view diagram of a schematic cross-sectional diagram of a hollow fiber membrane module according to Embodiment 3 of the present invention.

FIG. 4 illustrates Embodiment 3 of the present invention. The present embodiment shows a configuration where the structure of the case is different from that of Embodiment 1. Other features and effects are identical to those of in Embodiment 1, and hence identical constituent portions will be denoted by the same reference numerals, and an explanation thereof will be omitted.

FIG. 4 is a partial enlarged-view diagram of a schematic cross-sectional diagram of a hollow fiber membrane module according to Embodiment 3 of the present invention, in which the vicinity of a sealing part is enlarged. In the present embodiment, a stepped portion having an internal side surface 110a and an external side surface 110b is provided in a portion, which is in contact with the sealing and fixing part 310, of the inner peripheral surface 110 of the case 100. A stepped portion that conforms to the stepped portion of the case 100 is provided in the sealing and fixing part 310. This prevents the sealing and fixing part 310 from becoming positionally offset, particularly inwards, relative to the case 100. This can ease shear stress acting on the sealing part 410. The configurations of the sealing part 410 and so forth are identical to those of Embodiment 1, and hence effects identical to those of Embodiment 1 can be achieved herein. Similarly to Embodiment 1, in the present embodiment, the case 100 and the sealing and fixing parts 310, 320 are separated from each other. In FIG. 4, the portion where the inner peripheral surface 110 of the case 100 and the sealing and fixing part 310 are in contact with each other (portion of the two-dot chain line in the figure) is a separation portion.

Embodiment 4

Figure 5:
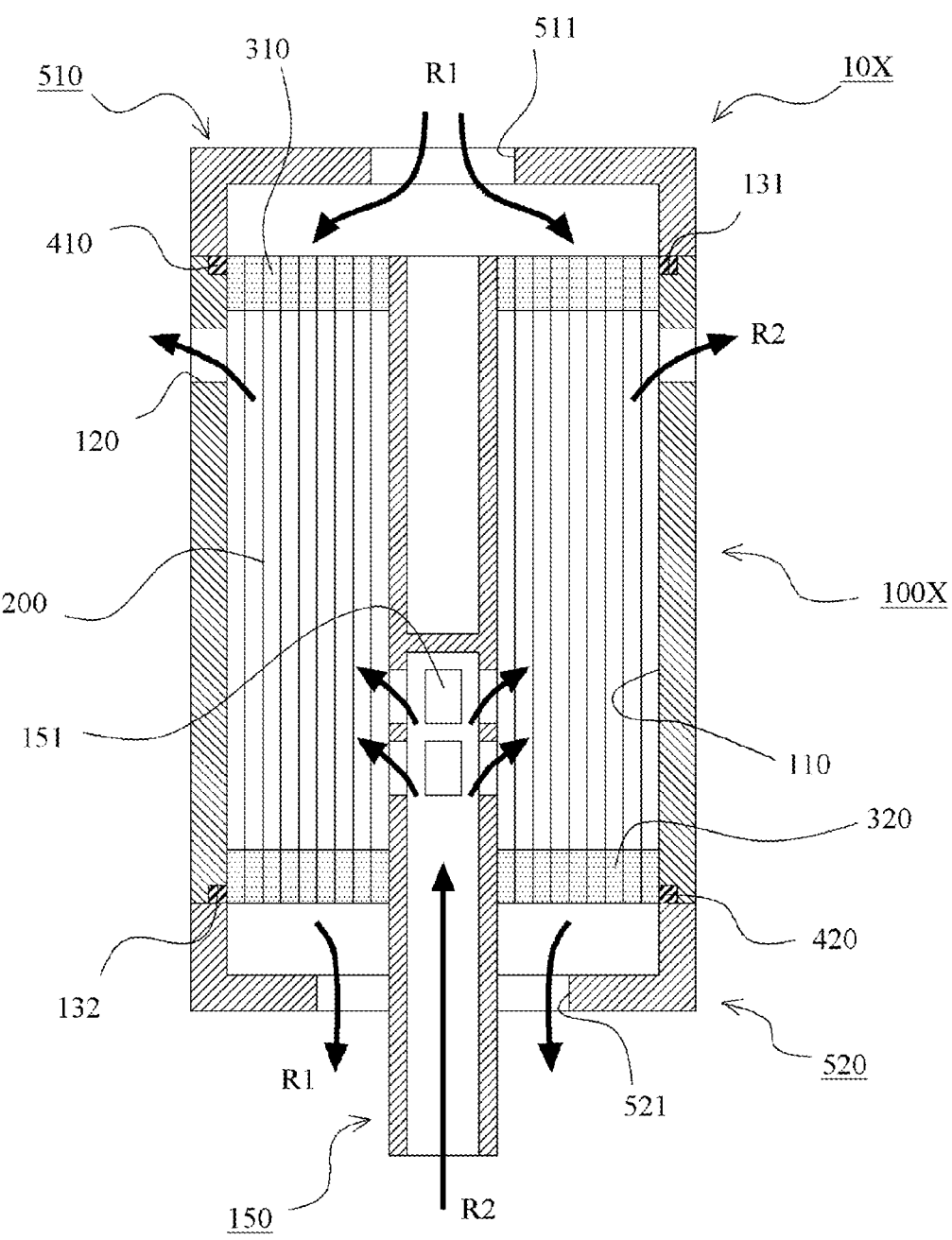
FIG. 5 is a schematic cross-sectional diagram of a hollow fiber membrane module according to Embodiment 4 of the present invention.

FIG. 5 illustrates Embodiment 4 of the present invention. In the present embodiment, a configuration is shown in which an inner case (inner pipe) is provided. Other features and effects are identical to those of in Embodiment 1, and hence identical constituent portions will be denoted by the same reference numerals, and an explanation thereof will be omitted.

FIG. 5 is a schematic cross-sectional diagram of a hollow fiber membrane module according to Embodiment 4 of the present invention along a plane that includes the center of an opening of a case. A hollow fiber membrane module 10X according to the present embodiment includes a tubular case 100X and an inner case (inner pipe) 150 provided inside the case 100X. In the present embodiment, a plurality of hollow fiber membranes 200 is disposed in an annular gap between the case 100X and the inner case 150. Embodiment 4 is similar to Embodiment 1 in that the sealing and fixing parts 310, 320 are provided at respective ends of the plurality of hollow fiber membranes 200. The inner case 150 is provided with through-holes 151 that are used as an inlet or an outlet for fluid.

An instance where the hollow fiber membrane module 10X configured as described above is used as a humidifier will be explained next. As illustrated in FIG. 5, a gas to be humidified (for instance dry air) is supplied into the case 100X via the through-hole 511 of the lid member 510. Then the gas to be humidified passes through the hollow interior of the hollow fiber membranes 200 and is discharged out of the through-hole 521 of the lid member 520 (see arrows R1). A moist gas is supplied into the inner case 150 through the end of the inner case 150. Then the moist gas gets into the case 100X via the through-hole 151 of the inner case 150, passes over the exterior of the hollow fiber membranes 200, and flows out of the through-hole 120 to the exterior of the case 100 (see arrows R2). Then, moisture in the moist gas migrates, by virtue of the membrane separation action of the hollow fiber membranes 200, towards the gas to be humidified, to elicit humidification of the gas.

The configurations of the sealing parts 410, 420 and so forth are identical to those of Embodiment 1, and hence effects identical to those of Embodiment 1 can be achieved herein. Features illustrated in Embodiments 2 and 3 can be adopted in the present embodiment as well. Similarly to Embodiment 1, also in the present embodiment, the case 100X and the sealing and fixing parts 310, 320 are separated from each other.

Embodiment 5

Figure 6:
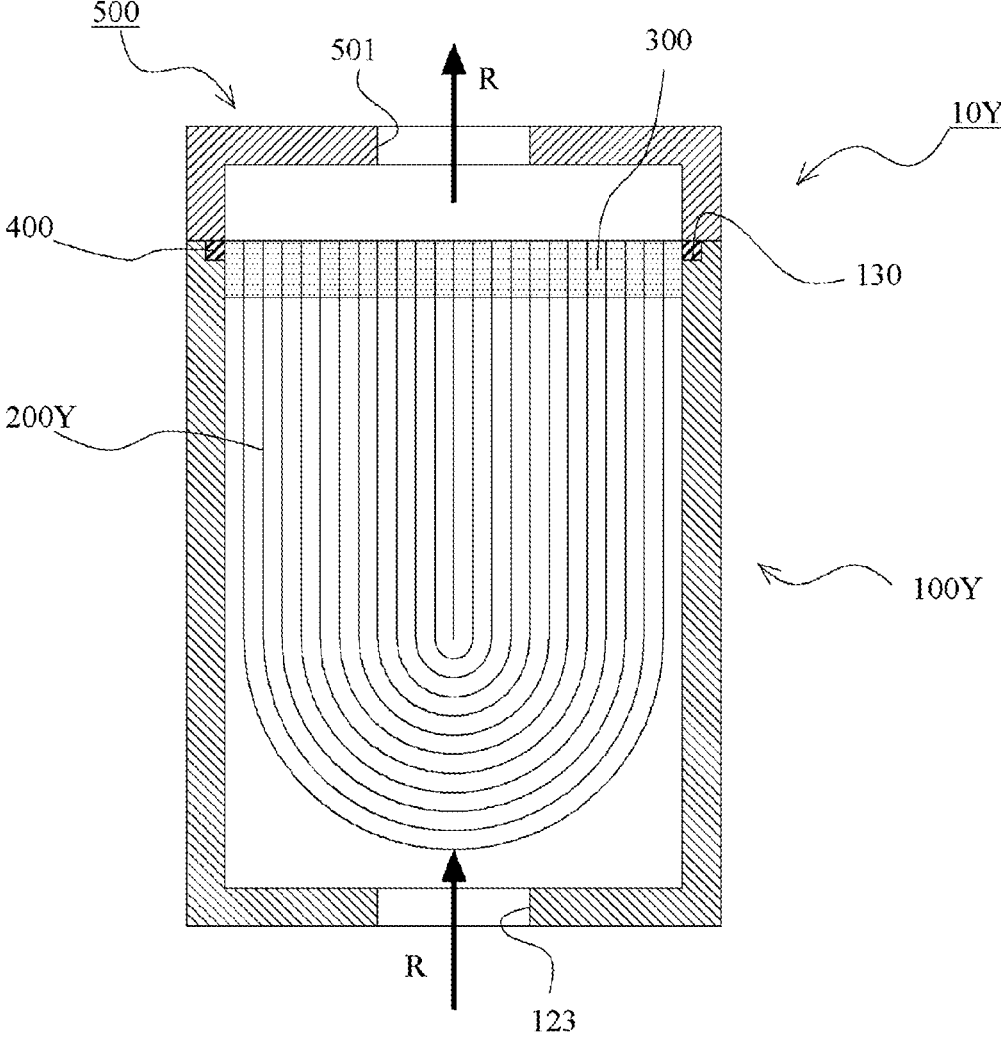
FIG. 6 is a schematic cross-sectional diagram of a hollow fiber membrane module according to Embodiment 5 of the present invention.

FIG. 6 illustrates Embodiment 5 of the present invention. While Embodiment 1 shows a configuration in which sealing and fixing parts are provided on respective sides of the bundle of hollow fiber membranes, the present embodiment shows a configuration where a bundle of hollow fiber membranes is bent to a U-shape and a sealing and fixing part is provided on one end of the bundle of hollow fiber membranes. Other features and effects are identical to those of in Embodiment 1, and hence identical constituent portions will be denoted by the same reference numerals, and an explanation thereof will be omitted.

FIG. 6 is a schematic cross-sectional diagram of a hollow fiber membrane module according to Embodiment 5 of the present invention along a plane that includes the center of an opening of a case. A hollow fiber membrane module 10Y according to the present embodiment includes a tubular case 100Y, of which one end is open, a plurality of hollow fiber membranes 200Y disposed inside the case 100Y, and a sealing and fixing part 300 provided at an end of the plurality of hollow fiber membranes 200Y. In the present embodiment, the bundled hollow fiber membranes 200Y are bent into a U-shape, and the sealing and fixing part 300 is provided on the opening side of the case 100Y. Similarly to Embodiment 1, the sealing and fixing part 300 is configured to seal gaps between the hollow fiber membranes 200Y, and to fix the hollow fiber membranes to each other, in a state where the hollow interior of the hollow fiber membranes 200Y is left open. A sealing part 400 that seals the annular gap between the case 100Y and the sealing and fixing part 300 is provided in the hollow fiber membrane module 10Y according to the present embodiment. A lid member 500 is provided on one end side of the case 100Y.

In the present embodiment, a through-hole 123 used as an inlet or an outlet for fluid is provided in the case 100Y on the opposing side with respect to the opening of the case 100Y. The lid member 500 is also provided with a through-hole 501 that is used as an inlet or an outlet for fluid.

An instance where the hollow fiber membrane module 10Y configured as described above is used as a filtering device will be explained next. As illustrated in FIG. 6, a liquid to be filtered is supplied into the case 100Y via the through-hole 123 of the case 100Y. Then the liquid to be filtered flows from the exterior of the hollow fiber membranes 200Y into the hollow interior, is discharged from an end of the sealing and fixing part 300, and is further discharged out of the through-hole 501 of the lid member 500 (see arrows R). As a result, for instance impurities contained in the liquid to be filtered are removed by the hollow fiber membranes 200Y, and the filtered liquid is discharged from the case 100Y and the lid member 500.

The configurations of the sealing part 400 and so forth are identical to those of Embodiment 1, and hence effects identical to those of Embodiment 1 can be achieved herein. Features illustrated in Embodiments 2 and 3 can be adopted in the present embodiment as well. Similarly to Embodiment 1, also in the present embodiment, the case 100Y and the sealing and fixing part 300 are separated from each other.

(Others)

The above embodiments illustrate configurations in which at least part of a portion, which is in contact with the case, of the sealing part is not bonded to the case so that the sealing part is allowed to expand or contract in the direction in which the spacing of the gap between the case and the sealing and fixing part changes. A configuration may be adopted in which a gap is provided between the sealing parts and a planar portion of cutouts so that the sealing part is allowed to expand or contract in the direction in which the spacing of the gap between the case and the sealing and fixing parts changes.

REFERENCE SIGNS LIST

100, 100X, 100Y Case
110 Inner peripheral surface
111 Annular depressed portion
120, 121, 122, 123 Through-hole
131, 132 Cutout
131a Planar portion
131b Inner peripheral surface portion
150 Inner case
151 Through-hole
200, 200Y Hollow fiber membrane
300, 310, 320 Sealing and fixing part
311 Protruded portion
400, 410, 420 Sealing part
410S Outer peripheral surface
410T Inner peripheral surface
500, 510, 520 Lid member
501, 511, 521 Through-hole

The invention claimed is:

1. A hollow fiber membrane module, comprising:
a tubular case of which at least one end is open;
a plurality of hollow fiber membranes disposed within the case;
a sealing and fixing part that seals a gap between the hollow fiber membranes and fixes the hollow fiber membranes to each other at an opening side of the case and an end of the plurality of hollow fiber membranes, while leaving a hollow interior of the hollow fiber membranes open; and
a sealing part that seals an annular gap between the case and the sealing and fixing part,
wherein the sealing part is bonded to an inner peripheral surface of the case and to an outer peripheral surface of the sealing and fixing part, while being allowed to expand or contract in a direction in which a spacing of the gap between the case and the sealing and fixing part changes; and
wherein at least part of a portion, which is in contact with the case, of the sealing part is not bound to the case so that the sealing part is allowed to expand or contract in the direction in which the spacing of the gap between the case and the sealing and fixing part changes.

2. A hollow fiber membrane module, comprising:
a tubular case of which at least one end is open;
a plurality of hollow fiber membranes disposed within the case;
a sealing and fixing part that seals a gap between the hollow fiber membranes and fixes the hollow fiber membranes to each other at an opening side of the case and an end of the plurality of hollow fiber membranes, while leaving a hollow interior of the hollow fiber membranes open;

a sealing part that seals an annular gap between the case and the sealing and fixing part, wherein the sealing part is bonded to an inner peripheral surface of the case and to an outer peripheral surface of the sealing and fixing part, while being allowed to expand or contract in a direction in which a spacing of the gap between the case and the sealing and fixing part changes; and wherein at least part of a portion, which is in contact with the case, of the sealing part is not bonded to the case so that the sealing part is allowed to expand or contract in the direction in which the spacing of the gap between the case and the sealing and fixing part changes.

3. A hollow fiber membrane module, comprising:

a tubular case of which at least one end is open;

a plurality of hollow fiber membranes disposed within the case;

a sealing and fixing part that seals a gap between the hollow fiber membranes and fixes the hollow fiber membranes to each other at an opening side of the case and an end of the plurality of hollow fiber membranes, while leaving a hollow interior of the hollow fiber membranes open;

a sealing part that seals an annular gap between the case and the sealing and fixing part, wherein the sealing part is bonded to an inner peripheral surface of the case and to an outer peripheral surface of the sealing and fixing part, while being allowed to expand or contract in a direction in which a spacing of the gap between the case and the sealing and fixing part changes; and, wherein an annular cutout, in which the sealing part is mount, is provided on an end face side of the case, the cutout having a planar portion adjacent to the inner peripheral surface, which is in contact with the sealing and fixing part, of the case and an inner peripheral surface portion opposing an outer peripheral surface of the sealing and fixing part, and at least part of a portion, which is in contact with the planar portion, of the sealing part is not bonded to the case so that the sealing part is allowed to expand or contract in the direction in which the spacing of the gap between the case and the sealing and fixing part changes.

4. The hollow fiber membrane module according to claim 3, wherein the case is made of polyphenylene sulfide, the sealing and fixing part is made of an epoxy resin, and the sealing part is made of a cured liquid silicone material; and $0.01 \times L1 \le L2 \le 0.1 \times L1$ is satisfied, where, in a cross section of the sealing and fixing part and the sealing part along a plane that includes a center of the opening, L1 is a width of the sealing and fixing part in a direction perpendicular to a direction in which the hollow fiber membranes extend and L2 is a length of the portion, which is not in contact with the planar portion, of the sealing part, in the perpendicular direction.

5. The hollow fiber membrane module according to claim 3, wherein the case is made of polyphenylene sulfide, the sealing and fixing part is made of an epoxy resin, and the sealing part is made of a cured liquid silicone material; and $0.02 \times L1 \le L2 \le 0.05 \times L1$ is satisfied, where, in a cross section of the sealing and fixing part and the sealing part along a plane that includes a center of the opening, L1 is a width of the sealing and fixing part in a direction perpendicular to a direction in which the hollow fiber membranes extend and L2 is a length of the portion, which is not in contact with the planar portion, of the sealing part, in the perpendicular direction.

6. The hollow fiber membrane module according to claim 1, wherein an annular depressed portion is provided in a portion, which is in contact with the sealing and fixing part, of the inner peripheral surface of the case.

7. The hollow fiber membrane module according to claim 1, wherein a stepped portion is provided in a portion, which is in contact with the sealing and fixing part, of the inner peripheral surface of the case.

* * * * *